United States Patent [19]

Kitagawa et al.

[11] Patent Number: 4,939,209

[45] Date of Patent: Jul. 3, 1990

[54] UNSATURATED COPOLYMER RESIN COMPOSITE

[75] Inventors: Sadao Kitagawa; Masaki Saito, both of Ibaraki; Shiroh Gotoh; Shin-ichi Yamauchi, both of Mie, all of Japan

[73] Assignee: Mitsubishi Petrochemical Co., Ltd., Tokyo, Japan

[21] Appl. No.: 430,970

[22] Filed: Nov. 1, 1989

Related U.S. Application Data

[63] Continuation of Ser. No. 120,837, Nov. 16, 1987, abandoned.

[30] Foreign Application Priority Data

Nov. 18, 1986 [JP] Japan .................................. 61-274339

[51] Int. Cl.$^5$ ............................................. C09F 255/06
[52] U.S. Cl. ..................................... 525/285; 522/120; 522/121; 522/124; 525/267; 525/286; 525/302; 525/307; 525/316
[58] Field of Search ............... 525/316, 289, 267, 285, 525/286, 302, 307

[56] References Cited

U.S. PATENT DOCUMENTS

| | | |
|---|---|---|
| 3,923,930 | 12/1975 | Waldbillig . |
| 3,933,769 | 1/1976 | Lal ........................................ 526/116 |
| 3,991,262 | 11/1976 | Lal ........................................ 526/116 |
| 4,275,177 | 6/1981 | Walkenhorst et al. .............. 525/316 |
| 4,366,296 | 12/1982 | Kitagawa et al. . |
| 4,680,318 | 7/1987 | Fuji et al. . |

FOREIGN PATENT DOCUMENTS

1156235 6/1969 United Kingdom .
1268149 3/1972 United Kingdom .

*Primary Examiner*—Jacob Ziegler
*Attorney, Agent, or Firm*—Oblon, Spivak, McClelland, Maier & Neustadt

[57] ABSTRACT

A polymer prepared by subjecting to conditions of radical graft polymerization a copolymer of an α-olefin and an aliphatic nonconjugated diene and a monomer that is capable of radical polymerization with said copolymer is described. This polymer has high miscibility with a dissimilar resin and has a high practical value for use as a compatibilizing agent in blending two or more resins.

13 Claims, No Drawings

UNSATURATED COPOLYMER RESIN COMPOSITE

This application is a continuation of application Ser. No. 120,837, filed on Nov. 16, 1987, now abandoned.

FIELD OF THE INVENTION

The present invention relates to an unsaturated copolymer resin in composite form. More particularly, the present invention relates to an unsaturated copolymer resin composite prepared by subjecting to conditions of radical graft polymerization an unsaturated copolymer resin composed of a specified α-olefin and a specified aliphatic nonconjugated diene together with a monomer capable of a radical polymerization The unsaturated copolymer resin to be used in the present invention has in its side chains those unsaturated groups which are derived from an aliphatic nonconjugated diene and is capable of further processing such as crosslinking and painting. However, the mechanical properties, thermal properties, solubility in organic solvents, miscibility with dissimilar resins and other characteristics of the resin are essentially the same as those of polyolefins and in order to realize its enhanced utilization, this resin requires modification in some aspects.

BACKGROUND OF THE INVENTION

Unsaturated copolymer resin

The unsaturated copolymer resin to be used in the present invention is known and can be prepared by copolymerizing an α-olefin having 2 to 12 carbon atoms with an aliphatic nonconjugated diene in the presence of a Ziegler-Natta catalyst. Examples of the unsaturated copolymer resin are disclosed in Japanese Laid-Open Patent Application Nos. 165907/80, 30413/81, 30414/81, 36508/81, 81 and 155416/84. These unsaturated copolymer resins are greatly improved over the conventional "polyolefinic resins" in terms of such aspects as crosslinkability, paintability and adhesive properties. However, the mechanical properties, thermal properties, solubility in organic solvent, miscibility with or dispersibility in dissimilar polymers and other properties of these unsaturated copolymer resins are essentially the same as those of the conventional polyolefinic resins.

Radical graft polymerization

The unsaturated copolymer resin composite of the present invention is prepared by radical graft polymerization and specific procedures of this polymerization are also known. One method consists of treating a blend of a polymer and a monomer with radiations such as γ-rays and electron beams. In another method, a polymer is treated with radiations and subsequently reacted with a monomer. In still another method, a mixture of a polymer and a monomer either in solution, in a molten state or in a dispersion is subjected to graft polymerization in the presence of an organic or inorganic peroxide or a redox-system radical polymerization catalyst.

An illustrative method of grafting onto a polyolefinic resin consists of performing graft polymerization of a monomer in an aqueous dispersion or suspension in the presence of polypropylene particles [see, for example, Japanese Patent Publication No. 2346/74 and Japanese Laid-Open Patent Application No. 32990/77]. According to this method, the polypropylene is modified to have fairly satisfactorily properties but because of the use of an ordinary polypropylene as a raw polymer, the solubility of the final product in organic solvents is far from being satisfactory (see Comparative Example 1 to be described later in this specification).

Grafted polymers derived from unsaturated rubbers (e.g. natural rubber, polybutadiene, polyisoprene, polychloroprene and ethylene-propylene-diene terpolymer (EPDM)) are also known and are extensively used in practice as adhesives, primers and impact-resistant resins (e.g. impact-resistant polystyrene and acrylonitrile-butadiene-styrene (ABS) resin). The solubility of these graft polymers in organic solvents is in a satisfactory range but in order to increase their elastic modulus, the amount of the rubbers that are used as raw polymers must be limited.

An example of the reaction for grafting onto the unsaturated copolymer resin used in the present invention is disclosed in Japanese Laid-Open Patent Application No. 98508/82 filed by the applicants of subject application. According to the specification of this prior application, the adhesive properties of the unsaturated copolymer resin is greatly improved. However, the monomers that can be used are limited to unsaturated organic acids or derivatives thereof and their use is limited to less than 50 parts by weight per 100 parts by weight of the unsaturated copolymer resin. Therefore, the unsaturated copolymer resin modified by the method described in Japanese Laid-Open Patent Application No. 98508/82 is not anticipated to exhibit high performance in terms of such aspects as adhesion to or blending with styrenic resins or polyphenylene ether resins. Furthermore, because of the limited amount of monomers used, the modified unsaturated copolymer resin is also unsatisfactory in solubility in organic solvents and in miscibility with, or dispersibility in, dissimilar polymers.

As described above, the prior art is not considered to provide a successfully engineered technique for realizing enhanced utilization of unsaturated copolymer resins by greatly improving their solubility in organic solvents and their miscibility with, or dispersibility in, dissimilar polymers without substantially impairing the superior mechanical or thermal properties of the unsaturated copolymer resins which are inherent in polyolefinic resins.

SUMMARY OF THE INVENTION

An object, therefore, of the present invention is to provide an unsaturated copolymer resin composite that is capable of enhanced utilization since it has a significantly improved solubility in organic solvents and a greatly increased miscibility with, or dispersibility in, dissimilar resins without substantially impairing the mechanical or thermal properties of the unsaturated copolymer resin.

The present inventors conducted extensive studies in order to develop a resin that is greatly improved in terms of solubility in organic solvents and in miscibility with, or dispersibility in, dissimilar polymers without substantially impairing the superior mechanical or thermal properties of polyolefinic resins. The present invention has been accomplished on the basis of the results of such studies.

Provided according to the present invention is an unsaturated copolymer resin composite prepared by subjecting 100 parts by weight of an unsaturated copolymer resin to conditions of radical graft polymerization together with more than 50 parts by weight but up to 300 parts by weight of a monomer capable of radical polymerization, said unsaturated copolymer resin being a copolymer composed of at least one α-olefin having 2 to 12 carbon atoms and at least one aliphatic nonconjugated diene represented by the following general formula (I), the content of said aliphatic nonconjugated diene being 0.05 to 50 mol %, and said unsaturated copolymer resin having an elastic modulus of 500 to 80,000 kg/cm²:

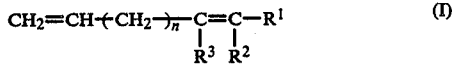
(I)

wherein n is an integer of 1 to 10; and R¹ to R³ are each a hydrogen atom or an alkyl group having up to 8 carbon atoms.

DETAILED DESCRIPTION OF THE INVENTION

In accordance with the present invention, the unsaturated copolymer resin specified above is used as a raw polymer and this permits many types of radical-polymerizable monomers to be used in widely varying amounts. As a result, heretofore unattainable resins can be furnished that are greatly improved in terms of solubility in organic solvents and miscibility with, or dispersibility in, dissimilar polymers without substantially impairing the mechanical and thermal properties of the unsaturated copolymer resin which are inherent in polyolefinic resins.

Therefore, the unsaturated copolymer resin composite invention finds direct use as a variety of shaped articles. In addition, this composite is anticipated to display superior performance as a melt adhesive for bonding polyolefinic resins to dissimilar polymers, as an aid for blending polyolefinic resins with dissimilar polymers, or as a primer dissolved in organic solvents.

The unsaturated copolymer resin composite of the present invention contains unsaturated carbon-carbon bonds in side chains in its molecular structure and may be readily subjected to further modifications such as crosslinking and the addition of various groups or compounds. Therefore, the so modified composites have a potential to be used as various functional resins.

What is unique about the present invention is that although the unsaturated copolymer resin used has an inherent nature to produce a large amount of gel (i.e., the portion insoluble in boiling xylene) when reacted with a radical generating source, there are many cases in which the amount of gel produced is significantly reduced in the presence of a radical-polymerizable monomer, and that even if a large amount (≧30 wt %) of gel is formed, the suitable device such as a Brabender Plastograph so as to reduce the gel content to a level at which the resin can be formed into a desired shape. The discovery of these facts was quite unexpected to the present inventors.

Unsaturated copolymer resin

The unsaturated copolymer resin used in the present invention is a copolymer of an α-olefin having 2 to 12 carbon atoms and an aliphatic nonconjugated diene represented by the following formula (I) and it has an aliphatic nonconjugated diene content of 0.05 to 50 mol % and an elastic modulus of 500 to 80,000 kg/cm²:

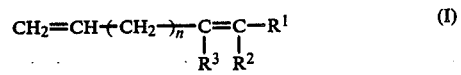
(I)

wherein n is an integer of 1 to 10; and R¹ to R³ are each a hydrogen atom or an alkyl group having up to 8 carbon atoms.

The α-olefin which is one of the two components of the unsaturated copolymer resin may be exemplified by ethylene, propylene, 1-butene, 1-hexene, 3-methyl-1-butene, 3-methyl-1-pentene, 4-methyl-1-pentene, 3,3-dimethyl-1-butene, 4,4-dimethyl-1-pentene, 3-methyl-1hexene, 4-methyl-1-hexene, 4,4-dimethyl-1-hexene, 5-methyl-1-hexene, allyl cyclopentane, allyl cyclohexane, allyl benzene, 3-cyclohexyl-1-butene, vinyl cyclopropane, vinyl cyclohexane, and 2-vinyl bicyclo[2,2,1]heptane. Among these compounds, ethylene, propylene, 1-butene, 1hexene, 3-methyl-1-butene, 3-methyl-1-pentene, 4-methyl-1-pentene and 3-methyl-1-hexene are preferred, and ethylene, propylene, 1-butene, 3-methyl-1-butene and 4-methyl-1pentene are particularly preferred. These α-olefins may be used singularly or if the unsaturated copolymer resin has an elastic modulus within the range of 500 to 80,000 kg/cm², they may be used in combination. If 1-hexene is used as an α-olefin, it is preferably used in combination with at least one of ethylene, propylene, 1-butene, 4-methyl-1-pentene and 3-methyl-1-butene if two or more α-olefins are used, they may be distributed in the unsaturated copolymer resin either randomly or in blocks.

The aliphatic nonconjugated diene represented by the formula (I) is preferably such that n is an integer of 1 to 3 and that R¹, R² and R³ are each a hydrogen atom or an alkyl group having 1 to 4 carbon atoms, provided that not all of R¹, R² and R³ are a hydrogen atom at the same time. In a particularly preferred case, n is 1, R¹ is an alkyl group having 1 to 3 carbon atoms, and R² and R³ are each a hydrogen atom or an alkyl group having 1 to 3 carbon atoms, provided that R² and R³ are not a hydrogen atom at the same time.

Advantageous examples of the aliphatic nonconjugated diene represented by the formula (I) are listed below: aliphatic 1,4-dienes such as 2-methyl-1,4pentadiene, 4-methylidene-1-hexene, 1,4-hexadiene, 4-methyl-1,4-hexadiene, 5-methyl-1,4-hexadiene, 1,4-heptadiene, 4-ethyl-1,4-hexadiene, 4,5-dimethyl-1,4-hexadiene, 4-methyl-1,4-heptadiene, 4-ethyl-1,4heptadiene, 5-methyl-1,4-heptadiene and 5-methyl-1,4octadiene; aliphatic 1,5-dienes such as 1,5-heptadiene, 1,5-octadiene, 5-methyl-1,5-heptadiene, 6-methyl-1,5heptadiene and 2-methyl-1,5-hexadiene; and aliphatic 1,6dienes such as 1,6-octadiene, 6-methyl-1,6-octadiene, 7-methyl 1,6-octadiene and 2-methyl-1,6-heptadiene.

Among these compounds, 4-methyl-1,4-hexadiene and 5-methyl-1,4-hexadiene are particularly preferred.

These nonconjugated dienes may be used either singularly or in combination, an advantageous example of the latter case being the combination of 4-methyl-1,4-hexadiene and 5-methyl-1,4-hexadiene (in a weight ratio of 95:5 to 5:95).

These aliphatic nonconjugated dienes may be distributed in the unsaturated copolymer resin either randomly or in blocks.

The aliphatic nonconjugated diene is present in the unsaturated copolymer resin in an amount that preferably ranges from 0.1 to 30 mol %, more preferably from 0.5 to 15 mol %. If the amount of the aliphatic nonconjugated diene is less than 0.05 mol %, the content of unsaturated groups in the unsaturated copolymer resin is too small to increase the efficiency of grafting and it is difficult to attain a desired unsaturated copolymer resin composite that is improved in solubility in organic solvents and in miscibility with, or dispersibility in, dissimilar polymers. On the other hand, if the amount of the aliphatic nonconjugated diene exceeds 50 mol %, the progress of copolymerization in the production of the unsaturated copolymer resin is retarded. In case of slurry polymerization, the formation of by-product polymers that are soluble in solvent is accelerated to cause an increase in the viscosity of the polymerization system, which not only lowers the production rate of the polymer but also results in the production of a sticky or non-resinous unsaturated copolymer.

The unsaturated copolymer resin used in the present invention is a resinous material that has an elastic modulus which, as measured in accordance with JIS K 7203 (equivalent to ASTM D-790), is within the range of 500 to 80,000 kg/cm$^2$, preferably 1,000 to 50,000 kg/cm$^2$, more preferably 2,000 to 30,000 kg/cm$^2$.

There is no particular limitation on the molecular weight of the unsaturated copolymer resin so long as it maintains the resinous nature defined above. As a guide, if the $\alpha$-olefin is principally composed of propylene, the molecular weight of the unsaturated copolymer resin is such that its melt flow rate (MFR) as measured in accordance with JIS K 6758 is usually in the range of 0.001 to 500 g/10 min, preferably 0.01 to 200 g/10 min, more preferably 0.05 to 100 g/10 min.

From the viewpoint of its molecular structure, the unsaturated copolymer resin is classified into the following three preferable types: (1) a random copolymer of one or more $\alpha$-olefins and one or more aliphatic nonconjugated dienes; (2) a block copolymer comprising a polymer block of at least one $\alpha$-olefin and a block of random copolymer of at least one $\alpha$-olefin and at least one aliphatic nonconjugated diene (the type and proportion of the $\alpha$-olefin in the first polymer block may be the same or different from those of the $\alpha$-olefin in the random copolymer block); and (3) a block copolymer comprising block (a) which is a block of random copolymer of at least one $\alpha$-olefin and at least one aliphatic nonconjugated diene and block (b) which is a block of random copolymer of an $\alpha$-olefin and an aliphatic nonconjugated diene, at least one of the type, number and proportion of the $\alpha$-olefin in block (b) or at least one of the type, number and proportion of the aliphatic nonconjugated diene in block (b) being different from those in block (a).

The term "block copolymer" as used herein may be defined as follows. First, "a block copolymer comprising a block of homopolymer of monomer A and a block of random copolymer of monomer A and monomer B" includes not only one that is totally composed of a structure of the type A~A-AABABAAAAB~produced by chemical bonding between a block of homopolymer of monomer A and a block of random copolymer of monomer A and monomer B, but also one that is a mixture of such a block copolymer totally composed of the structure with a homopolymer of monomer A, a random copolymer of monomers A and B, etc.

In like manner, "a block copolymer comprising block (a) and block (b)" includes not only one that is totally composed of a structure in which block (a) is chemically bound to block (b), but also one that is a mixture of such a block copolymer totally composed of the structure with a polymer of block (a), a polymer of block (b), etc. Therefore, the term "block copolymer" as used herein has the same meaning as that of the "block copolymers" that are synthesized by using Ziegler-Natta catalysts.

Preferred examples of the unsaturated copolymer resin are specifically listed below: a random copolymer of propylene and 4-methyl-1,4-hexadiene; a random copolymer of propylene and 5-methyl-1,4-hexadiene; a random copolymer of propylene, 4-methyl-1,4-hexadiene and 5-methyl-1,4-hexadiene; a random copolymer of propylene, ethylene, 4-methyl-1,4-hexadiene and 5-methyl-1,4-hexadiene; a block copolymer composed of a block of homopolymer of propylene and a block of random copolymer of propylene, 4-methyl-1,4-hexadiene and 5-methyl-1,4-hexadiene; a block copolymer composed of a block of homopolymer of propylene and a block of random copolymer of ethylene, 4-methyl-1,4-hexadiene and 5-methyl-1,4-hexadiene; a block copolymer composed of a block of homopolymer of ethylene and a block of random copolymer of propylene, 4-methyl-1,4-hexadiene and 5-methyl-1,4-hexadiene; a block copolymer composed of a block of random copolymer of propylene and ethylene and a block of random copolymer of propylene, ethylene, 4-methyl-1,4-hexadiene and 5-methyl-1,4-hexadiene; a block copolymer composed of a block of random copolymer of ethylene, 4-methyl-1,4-hexadiene and 5-methyl-1,4-hexadiene and a block of random copolymer of propylene, 4-methyl-1,4-hexadiene and 5-methyl-1,4-hexadiene; a block copolymer composed of a block of random copolymer of propylene, 4-methyl-1,4-hexadiene and 5-methyl-1,4-hexadiene and a block of random copolymer of propylene, ethylene, 4-methyl-1,4-hexadiene and 5-methyl-1,4-hexadiene; a block copolymer composed of a block of random copolymer of propylene, 4-methyl-1,4-hexadiene and 5-methyl-1,4-hexadiene, a block of random copolymer of propylene, ethylene, 4-methyl-1,4-hexadiene and 5-methyl-1,4-hexadiene and a block of random copolymer of ethylene, 4-methyl-1,4-hexadiene and 5-methyl-1,4-hexadiene; a block copolymer composed of a block of random copolymer of ethylene, 4-methyl-1,4-hexadiene and 5-methyl-1,4-hexadiene and a block of random copolymer of propylene, ethylene, 4-methyl-1,4-hexadiene and 5-methyl-1,4-hexadiene; a random copolymer of ethylene and 1,4-hexadiene; a random copolymer of ethylene and 4-methyl-1,4-hexadiene; a random copolymer of ethylene and 5-methyl-1,4-hexadiene; a random copolymer of ethylene, 4-methyl-1,4-hexadiene and 5-methyl-1,4-hexadiene; a random copolymer of ethylene, propylene, 4-methyl-1,4-hexadiene and 5-methyl-1,4-hexadiene; a random copolymer of ethylene, butene, 4-methyl-1,4-hexadiene and 5-methyl-1,4-hexadiene; a random copolymer of ethylene, 1-hexene, 4-methyl-1,4-hexadiene and 5-methyl-1,4-hexadiene; a random copolymer of ethylene, 4-methyl-1-pentene, 4-methyl-1,4-hexadiene and 5-methyl-1,4-hexadiene; a block copolymer composed of a block of homopolymer of ethylene and a block of random copolymer of ethylene and 1,4-hexadiene; a block copolymer composed of a block of homopolymer of ethylene and a block of random copolymer of ethylene, 4-methyl-1,4-hexadiene and 5-methyl-1,4-hexadiene; a random copolymer of 1-butene, 4-methyl-1,4-hexadiene and 5-methyl-1,4-hexadiene; a random copolymer of 3-methyl-1-butene, 4-methyl-1,4-hexadiene and 5-methyl-1,4-hexadiene; and a random copolymer of 4-methyl-1-pentene, 4-methyl-1,4-hexadiene and 5-methyl-1,4-hexadiene. From the viewpoint of the availability of α-olefins and of the ease of copolymer production, the following unsaturated copolymer resins are particularly preferred: a random copolymer of propylene, 4-methyl-1,4-hexadiene and 5-methyl-1,4-hexadiene; a block copolymer composed of a block of homopolymer of propylene and a block of random copolymer of ethylene, 4-methyl-1,4-hexadiene and 5-methyl-1,4-hexadiene; a random copolymer of ethylene, 4-methyl-1,4-hexadiene and 5-methyl-1,4-hexadiene; a random copolymer of propylene, ethylene, 4-methyl-1,4-hexadiene and 5-methyl-1,4-hexadiene; and a block copolymer composed of a block of random copolymer of ethylene, 4-methyl-1,4-hexadiene and 5-methyl-1,4-hexadiene and a block of random copolymer of propylene, 4-methyl-1,4-hexadiene and 5-methyl-1,4-hexadiene.

Radical polymerizable monomer

The monomer to be grafted onto the unsaturated copolymer resin is a compound that is capable of homopolymerization or copolymerization by the mechanism of radical polymerization (this compound is hereinafter simply referred to as the monomer).

The monomer includes in its category vinyl monomers, vinylidene monomers, α,β-unsaturated carboxylic acids, and derivatives thereof. Specific examples of such monomers are: styrene based monomers such as styrene, nuclear substituted styrenes (e.g., methylstyrene, dimethylstyrene, ethylstyrene, isopropylstyrene, chlorostyrene, styrene, and chloromethylstyrene), and α-substituted styrenes (e.g., α-methylstyrene and α-ethylstyrene); vinyl and vinylidene halides such as vinyl chloride, vinyl bromide, vinylidene chloride and vinylidene bromide; acrylonitrile; methacrylonitrile; vinyl acetate; vinyl naphthalene; vinyl carbazole; vinylpyridine; vinylpyrrolidone; methyl vinyl ketone; unsaturated carboxylic acids such as acrylic acid, methacrylic acid, maleic acid, fumaric acid, itaconic acid, citraconic acid, 3,6-endomethylene-1,2,3,6-tetrahydrophthalic acid, and crotonic acid; and derivatives of such unsaturated carboxylic acids as illustrated by their esters (with about 1 to 10 carbon atoms in the alcohol component), anhydrides, metal salts, amides and imides. Preferred examples are: styrene, α-methylstyrene, vinyl chloride, acrylonitrile, vinyl acetate, esters of acrylic acid, methacrylic acid, maleic acid or fumaric acid, in which the alcohol component contains an alkyl moiety having 1 to 8 carbon atoms, glycidyl acrylate, glycidyl methacrylate, an alkyl ($C_{1-8}$) glycidyl maleate, an alkyl ($C_{1-8}$) glycidyl fumarate, and maleic anhydride. More preferred examples are: styrene, an acrylate ester, a metharylate ester and a fumarate ester, the alcohol component of each of said esters containing an alkyl moiety having 1 to 8 carbon atoms. Another more preferred examples are: glycidyl acrylate, glycidyl methacrylate, an alkyl ($C_{1-8}$) glycidyl maleate, an alkyl ($C_{1-8}$) glycidyl fumarate.

These monomers are used either alone or in combination. Unsaturated carboxylic acids or derivatives thereof are frequently used in combination with other monomers.

The monomers are used in amount of more than 50 parts by weight but up to 300 parts by weight per 100 parts by weight of the unsaturated copolymer resin. The preferred range is from 52 to 200 parts by weight, and the range of 55 to 150 parts by weight is particularly preferred. If the monomers are used in amounts of up to 50 parts by weight, they are little effective in achieving the improvement that is to be obtained by the present invention. If the monomers are used in amounts exceeding 300 parts by weight, the mechanical properties of the unsaturated copolymer resin will not be fully exhibited. Production of unsaturated copolymer resin composite:

The unsaturated copolymer resin composite of the present invention is produced by subjecting the unsaturated copolymer resin to known conditions of radical graft polymerization together with the monomer. Any known method of radical graft polymerization may be employed; for example, a method of treating a mixture of the unsaturated copolymer resin and the monomer with radiations such as γ-rays and electron beams, or a method of treating the unsaturated copolymer resin with a radiation and then reacting the treated resin with the monomer, or a method in which a mixture of the unsaturated copolymer and the monomer either in solution, in a molten state or in dispersion is subjected to graft polymerization in the presence of an organic or inorganic peroxide or a redox-system radical polymerization catalyst, may be adopted as appropriate. A particularly preferred method is such that the particles of the unsaturated copolymer resin are impregnated with the monomer in an aqueous dispersion/suspension and the impregnated particles are subjected to graft polymerization in the presence of a radical polymerization catalyst, and this method is hereunder described in greater detail.

There is no particular limitation on the size of the particles of the unsaturated copolymer resin and it may be in the form of a powder as emerging from the step of its synthesis or, alternatively, the powder may be shaped into pellets by means of an extruder or some other machine. In order to facilitate subsequent impregnation with the monomer, the pellets preferably have an average particle size of about 1 to 5 mm. If the average size of the particles in the powder is too small, say up to 0.05 mm, the particles may fuse or agglomerate during the production of the unsaturated copolymer resin composite, but this problem can be avoided by proper selection of such factors as the ratio of the resin to water, the agitating speed, and the type or amount of a suspending agent.

Preferably, the radical polymerization catalyst is oil-soluble and has a 10-hour half-life temperature (i.e., the decomposition temperature at which the catalyst's half life is 10 hours) in the range of 40 to 150° C., with the range of 50 to 130° C. being particularly preferred. Specific examples of the radical polymerization catalyst include isobutyryl peroxide, cumyl peroxyneodecanoate, diisopropyl peroxydicarbonate, diallyl peroxydicarbonate, cumyl peroxyneohexanoate, di(methoxyisopropyl)peroxydicarbonate, di(2-ethylhexyl)peroxy dicarbonate, t-butyl peroxyneodecanoate, t-butyl peroxyneohexanoate, 2,4-dichlorobenzoyl peroxide, t-hexyl peroxypivalate, t-butyl peroxypivalate, 3,5,5-trimethylhexanoyl peroxide, octanoyl peroxide, cumyl peroxyoctoate, acetyl peroxide, t-butyl peroxy(2-ethylhexanoate), m-toluoyl peroxide, benzoyl peroxide, t-butyl peroxyisobutyrate, 1,1-bis(t-butylperoxy)cyclohexane, t-butyl peroxymaleate, t-butyl peroxy-3,5,5-trimethyl hexanoate, cyclohexanone peroxide, t-butyl peroxyisopropyl carbonate, 2,5-dimethyl-2,5-di(benzoylperoxy)-hexane, t-butyl peroxyacetate, 2,2-bis(t-butylperoxy)butane, t-butyl peroxybenzoate, di-t-butyl diperoxyisophthalate, methyl ethyl ketone peroxide, dicumyl peroxide, t-butyl cumyl peroxide, di-t-butyl peroxide, p-menthane hydroperoxide, 2,5-dimethyl-2,5-di(t-butyl-peroxy)hexane-3, 2,5-dimethyl-hexane-2,5-dihydroperoxide, cumene hydroperoxide, and t-butyl hydroperoxide. Among these examples, those which are preferred are cumyl peroxyneohexanoate, t-butyl peroxyneodecanoate, t-butyl peroxyneohexanoate, 2,4-dichlorobenzoyl peroxide, t-hexyl peroxypivalate, t-butyl peroxypivalate, 3,5,5-trimethylhexanoyl peroxide, octanoyl peroxide, acetyl peroxide, t-butyl peroxy(2-ethylhexanoate), benzoyl peroxide, t-butyl peroxyisobutyrate, t-butylperoxy-3,5,5-trimethylhexanoate, 2,5-dimethyl-2,5-di(-benzoylperoxy)hexane, t-butyl peroxyacetate, t-butyl peroxybenzoate, di-t-butyl diperoxyisophthalate, 2,5-dimethyl-2,5-di(t-butylperoxy)hexyne-3. Particularly preferred examples include t-butyl perpivalate, 3,5,5-trimethylhexanoyl peroxide, octanoyl peroxide, acetyl peroxide, benzoyl peroxide, t-butylperoxy-3,5,5-trimethyl hexanoate, 2,5-dimethyl-2,5-di(benzoylperoxy)hexane, t-butyl peroxyacetate, t-butyl peroxybenzoate, and di-t-butyl diperoxyisophthalate. These radical polymerization catalysts may be used either alone or in combination.

The radical polymerization catalyst is preferably added in the form of a solution in the monomer. If desired, the monomer is first impregnated in the unsaturated copolymer resin and then the catalyst dissolved in an organic solvent or the like is added in one or more portions.

The radical polymerization catalyst is used in an amount that generally ranges from 0.01 to 10 parts by weight, preferably from 0.1 to 1 part by weight, per 100 parts by weight of the monomer. If the amount of the catalyst is less than 0.01 part by weight per 100 parts by weight of the monomer, the latter will sometimes fail to be completely polymerized. If the amount of the catalyst is more than 10 parts by weight, per 100 parts by weight of the monomer, the unsaturated copolymer resin will undergo excessive crosslinking reaction or its reaction will proceed so vigorously as to present difficulty in the control of the reaction temperature. Furthermore, the residual unreacted radical polymerization catalyst will cause adverse effects during the shaping of the finally obtained copolymer resin composite.

If it is necessary to adjust the molecular weight of the polymerized portion of the monomer, any method that is commonly employed in radical polymerization to adjust molecular weight may be used. For example, the intended object may be attained either by adjusting the polymerization temperature, the amount of radical polymerization catalyst added or the amount of the monomer used, or by adding a molecular weight adjusting agent such as mercaptans and 2,4-diphenyl-4-methyl-1-pentene.

The aqueous dispersion/suspension to be used in the method under discussion is essentially the same as the aqueous suspension employed in performing an aqueous suspension polymerization of the monomer, except that the former contains the particles of the unsaturated copolymer resin in its system. Therefore, the particles of the unsaturated copolymer resin and the monomer in which the radical polymerization catalyst is preferably dissolved are dispersed under agitation in an aqueous medium in the presence of a suspending agent that is commonly employed in aqueous suspension polymerization, such as a water-soluble polymer (e.g., polyvinyl alcohol, polyvinyl pyrrolidone, or methyl cellulose) or a slightly soluble inorganic substance (e.g., calcium phosphate or magnesium oxide). A typical example of the aqueous medium is water but it may be a mixture of water and any suitable water-soluble substance or a mixture of water and a surfactant.

The contents of the unsaturated copolymer resin and the monomer in the aqueous suspension are not limited to any particular values so long as the system can be easily stirred to achieve such purposes as the removal of the heat of reaction and the prevention of agglomeration case, the unsaturated copolymer resin and the monomer are used in a total amount of 5 to 100 parts by weight, preferably 10 to 80 parts by weight, per 100 parts by weight of water. In producing the unsaturated copolymer resin composite by the method under discussion, it is preferable to impregnate the monomer and the radical polymerization catalyst in the particles of the unsaturated copolymer resin by first heating the system under such conditions that the radical polymerization catalyst will not be decomposed, nor will the monomer be substantially polymerized. The impregnation is preferably performed by stirring the aqueous medium, or allowing it to stand, until at least 80 wt %, preferably at least 90 wt %, of the monomer is impregnated in, or deposited on, the particles of the unsaturated copolymer resin. If more than 20 wt % of the monomer remains to be impregnated or deposited, problems will occur in a subsequent step of graft polymerization, such as the sole formation of the particles of a homopolymer of the monomer and uneven dispersion of the monomer in the unsaturated copolymer resin, and these problems will sometimes prevent the resulting unsaturated copolymer resin composite from exhibiting the desired characteristics to their fullest extent.

The monomer impregnation may be performed at any temperature for any duration of time so long as the above-stated object of the present invention can be attained. For instance, the temperature for impregnated at a value that is about 3° to 50° C. lower, preferably about 5° to 30° C. lower, than the 10-hour half-life temperature of the radical polymerization catalyst, and the period of impregnation is selected from the range of about 10 minutes to about 12 hours, preferably from about 30 minutes to about 10 hours.

The amount of the monomer that yet remains to be impregnated in or deposited on the unsaturated copolymer resin may be determined by the following procedures: a given amount of the aqueous suspension is sampled and quickly filtered through a screen having an opening size of, for example, about 300 mesh, so as to measure the amount of the particles of the unsaturated copolymer resin and that of the monomer dispersed in the liquid phase, and on the basis of the measured values and the amounts of the raw unsaturated copolymer resin and monomer, the proportion of the monomer that was not impregnated in or deposited on the resin is calculated.

The step of monomer impregnation is followed by graft polymerization. In this step, the aqueous suspension that has been subjected to the impregnation procedures described above is heated, preferably under stirring, in such a way that the radical polymerization catalyst is thoroughly decomposed and the monomer is polymerized. In order to facilitate subsequent recovery or removal of any unreacted monomer from the aqueous suspension or from the resulting unsaturated copolymer resin composite, the conditions of polymerization are typically selected in such a way that the conversion of the monomer to a polymer (i.e., rate of polymerization) is usually at least 50%, preferably at least 75%, more preferably at least 90%. Stated more specifically, the polymerization temperature (T°C.) is usually selected at a value that satisfies $T_{10}-3 \leq T \leq T_{10}+80$, preferably $T_{10} \leq T \leq T_{10}+70$, wherein $T_{10}$ is the 10-hour half-life temperature (°C.) of the radical polymerization catalyst. In order to prevent deterioration such as decomposition or crosslinking of the unsaturated copolymer resin and to avoid such problems as the agglomeration and fusion of the particles of the resulting unsaturated copolymer resin composite, T is preferably up to 150° C., with up to 140° C. being particularly preferred. The duration of polymerization may be selected at a value that ensures the accomplishment of the desired rate of polymerization specified above, and is usually selected from the range of about 30 minutes to about 50 hours, preferably from the range of about 1 to about 24 hours. The polymerization may be performed at a single stage with the temperature being held constant, or at a plurality of stages employing different temperatures. The reaction product is filtered after being optionally cooled, and the filtered product is dried after being washed with water, aqueous mineral acid, aqueous alkali or the like as required, and is put to a specific use.

Unsaturated copolymer resin composite

The unsaturated copolymer resin composite produced by the method described above is speculated to be a composite that contains, in addition to the polymer in which the monomer is grafted onto the unsaturated copolymer resin, the unsaturated copolymer resin and a homopolymer of the monomer.

As will be specifically demonstrated in Examples 1 to 8 given later in this specification, the unsaturated copolymer resin composite of the present invention has an appreciably improved solubility in organic solvents as compared with the unsaturated copolymer resin, so it is also speculated that the content of an unreacted portion of the unsaturated copolymer resin in this composite is quite low.

Another characteristic feature of the composite is that the polymerized monomeric portion (i.e., the monomer grafts and a homopolymer of the monomer) is finely dispersed in the composite as particles having a size of as small as 0.1 to 1 μm.

These two features of the composite of the present invention, namely, the high solubility in organic solvents and the fine dispersion of the polymerized monomeric portion, are by no means attainable either by using a simple blend of the unsaturated copolymer resin and the monomer or by replacing the unsaturated copolymer resin with other polyolefinic resins.

Utilization of the unsaturated copolymer resin composite

The unsaturated copolymer resin composite of the present invention has the advantage that by properly changing the type and quantity of the monomer used, the properties of the unsaturated copolymer resin, such as its solubility in organic solvents, formability into various shapes, impact resistance strength, elastic modulus, tensile strength, elongation, surface gloss, chemical reactivity, electrical properties, and miscibility with, or dispersibility in, dissimilar polymers, can be modified extensively and in varying degrees.

Therefore, the use of the unsaturated copolymer resin composite is not limited to its applications as shaped articles; it is also usable as a primer in solvents, a blend with dissimilar polymers, an aid for the blending of two or more polymers, or as a vehicle for a variety of adhesives and paints.

The following examples are provided for the purpose of further illustrating the present invention but are in no way to be taken as limiting.

EXAMPLE 1

An autoclave having an inner capacity of 1.3 liter was charged with 520 g of pure water, 15.6 g of tribasic calcium phosphate (suspending agent) and 1.56 g of a 1% aqueous solution of sodium dodecylbenzenesulfonate (suspending aid). The autoclave was further supplied with 100 g of the below-indicated unsaturated copolymer resin powder composed of propylene, ethylene and methylhexadiene (a mixture of 4-methyl-1,4-hexadiene and 5-methyl-1,4-hexadiene) (Resin No. 1), and the contents were stirred to make a uniform suspension.

Unsaturated copolymer resin powder (Resin No. 1)

| | |
|---|---|
| 4-methyl-1,4-hexadiene content[*1] | 0.6 mol % |
| 5-methyl-1,4-hexadiene content[*1] | 1.4 mol % |
| ethylene content[*2] | 2.9 wt % |
| average size of powder particles | 0.5 mm |
| flexural modulus (JIS K 7203) | 5,300 kg/cm$^2$ |
| melt flow rate (JIS K 6758) | 1.6 g/10 min |

[*1]measured by NMR analysis
[*2]measured by IR analysis

To the suspension, a solution having 0.3 g of t-butyl peroxybenzoate (radical polymerization catalyst) dissolved in 100 g of styrene was added and the mixture was stirred while the temperature in the autoclave was elevated to 90° C., which was maintained for 3 hours until the styrene containing the radical polymerization catalyst was impregnated in the unsaturated copolymer resin powder.

The temperature in the autoclave was then raised to 105° C. which was maintained for 2 hours to perform polymerization. The autoclave was further elevated to 125° C. which was maintained for 5 hours to complete the polymerization.

After being cooled to room temperature, the polymerization product was recovered from the autoclave and mixed with dilute nitric acid until the pH of the aqueous layer reached 2.5. The mixture was thoroughly stirred and the resulting unsaturated copolymer resin composite powder was recovered by filtration, washed with water and dried at 70° C. for 5 hours at a reduced pressure of 1 mmHg. The yield of the composite was 198 g.

One gram of this composite powder was extracted in a Soxhlet apparatus for 7 hours with 200 ml of boiling xylene. The extract was slowly poured into 500 ml of acetone at room temperature with stirring and held at room temperature for 5 hours. The precipitating portion was recovered by filtration and dried at 70° C. for 5 hours at a reduced pressure of 1 mmHg, followed by measurement of the weight of the xylene/acetone insoluble portion. The filtrate was evaporated to dryness with a rotary evaporator and dried at 70° C. for 5 hours at a reduced xylene/acetone soluble portion. The results of the two measurements are shown in Table 1.

The unsaturated copolymer resin composite prepared in Example 1 was pressed into a sheet and observation of a cross section of the sheet with an electron microscope revealed that the polymerized styrene portion was finely dispersed in Resin No. 1 as particles ranging in size from 0.1 to 0.5 μm.

EXAMPLE 2

The procedures of Example 1 were repeated except that Resin No. 1 was replaced by Resin No. 2 which was in the form of pellets (2 to 3 mm in size) extruded from Resin No. 1 and that the styrene monomer was replaced by 100 g of methyl methacrylate. The results are shown in Table 1.

EXAMPLE 3

The procedures of Example 2 were repeated except that 100 g of methyl methacrylate was replaced by a monomeric mixture composed of 50 g of styrene and 50 g of diethyl fumarate. The results are shown in Table 1.

EXAMPLE 4

The procedures of Example 2 were repeated except that 100 g of methyl methacrylate was replaced by a monomeric mixture composed of 50 g of styrene and 50 g of methyl acrylate. The results are shown in Table 1.

As shown in Table 1, as much as 77 wt % of the unsaturated copolymer resin composite prepared in Example 4 was left unextracted with xylene but when the composite was masticated with a Brabender Plastograph at 230° C. for 10 minutes, the unextracted content decreased to 9 wt % and the composite became moldable. In response to this change, the contents of the xylene/acetone insoluble portion and the xylene/acetone soluble portion changed to the values shown in brackets in Table 1.

EXAMPLE 5

The procedures of Example 2 were repeated except that 100 g of methyl methacrylate was replaced by a monomeric mixture composed of 99 g of styrene and 1 g of glycidyl methacrylate. The results are shown in Table 1.

EXAMPLE 6

The procedures of Example 1 were repeated except that Resin No. 1 was replaced by Resin No. 3, which was in the form of pellets of the unsaturated copolymer resin indicated below that was composed of propylene and methyl-1,4-hexadiene. The results are shown in Table 1.

Unsaturated copolymer resin pellets (Resin No. 3)

| 4-methyl-1,4-hexadiene content | 0.9 mol % |
| 5-methyl-1,4-hexadiene content | 2.1 mol % |
| flexural modulus (JIS K 7203) | 6,500 kg/cm$^2$ |
| melt flow rate (JIS K 6758) | 1.7 g/10 min |
| pellet size | 2–3 mm |

EXAMPLE 7

The procedures of Example 2 were repeated except that 0.3 g of t-butyl peroxybenzoate (radical polymerization catalyst) was replaced by a mixed catalyst of benzoyl peroxide (0.3 g) and t-butyl peroxybenzoate (0.1 g) and that the monomer was replaced by a monomeric mixture of styrene (50 g) and 2-ethylhexyl methacrylate (50 g), with the impregnation temperature and period being changed to 65° C. and 5 hours, respectively, while the polymerization was conducted at two stages (90° C.×3 hours, followed by 125° C.×4 hours). The results are shown in Table 1.

COMPARATIVE EXAMPLE 1

The procedures of Example 1 were repeated except that Resin No. 1 was replaced by 100 g of the powder of the propylene/ethylene copolymer resin noted below. The results are shown in Table 1.

Propylene/ethylene copolymer resin:

| ethylene content | 4.5 wt % |
| flexural modulus (JIS K 7203) | 6,000 kg/cm$^2$ |
| melt flow rate (JIS K 6758) | 6.0 g/10 min |
| average size of powder particles | 0.5 mm |

COMPARATIVE EXAMPLE 2

Without being subjected to radical graft polymerization, Resin No. 1 was tested for its solubility in a mixed solvent of xylene and acetone by the same method as used in Example 1. The amount of Resin No. 1 that remained unextracted with xylene was also measured by the same method as employed in Example 1. The results are shown in Table 1.

EXAMPLE 8

The procedures of Example 2 were repeated except that Resin No. 2 was replaced by Resin No. 4 (pellets of the unsaturated copolymer resin characterized below that was composed of ethylene and methyl-1,4-hexadiene), that 100 g of methyl methacrylate was replaced by a monomeric mixture of styrene (50 g) and methyl methacrylate (50 g) and that 0.3 g of t-butyl peroxybenzoate (radical polymerization catalyst) was replaced by a mixed catalyst of t-butyl peroxypivalate (0.3 g) and benzoyl peroxide (0.1 g), with the impregnation temperature and period being changed to 50° C. and 4 hours, respectively, while the polymerization was conducted at two stages (75° C.×5 hours, followed by 90° C.×3 hours). The results are shown in Table 1.

Unsaturated copolymer resin pellets (Resin No. 4)

| 4-methyl-1,4-hexadiene content | 1.2 mol % |
| 5-methyl-1,4-hexadiene content | 0.8 mol % |
| flexural modulus (JIS K 7203) | 6,800 kg/cm$^2$ |
| melt flow rate (JIS K 6760) | 1.3 g/10 min |
| pellet size | 2–3 mm |

TABLE 2

| | Raw Material | | Unsaturated Copolymer Resin Composite | | | |
| --- | --- | --- | --- | --- | --- | --- |
| Run No. | Resin (100 g) | Monomer (g) | Yield (g) | Content unextracted with xylene (wt %) | Xylene/acetone insoluble portion (wt %) | Xylene/acetone soluble portion (wt %) |
| Example | Resin No. 1 | styrene (100) | 198 | 0 | 2 | 98 |
| Example 2 | Resin No. 2 | methyl methacrylate (100) | 199 | 0 | 1 | 99 |
| Example 3 | Resin No. 2 | styrene (50) diethyl | 199 | 0.1 | 5.9 | 94 |

TABLE 2-continued

| | Raw Material | | Unsaturated Copolymer Resin Composite | | | |
|---|---|---|---|---|---|---|
| | | | Yield (g) | Content unextracted with xylene (wt %) | Xylene/acetone insoluble portion (wt %) | Xylene/acetone soluble portion (wt %) |
| Run No. | Resin (100 g) | Monomer (g) | | | | |
| Example 4 | Resin No. 2 | fumarate (50) styrene (50) | 198 | 77 (9) | 2 (16) | 21 (75) |
| Example 5 | Resin No. 2 | methyl acrylate (50) styrene (99) glycidyl methacrylate (1) | 199 | 5 | 22 | 73 |
| Example 6 | Resin No. 3 | styrene (100) | 199 | 0 | 3 | 97 |
| Example 7 | Resin No. 2 | styrene (50) 2-ethylhexyl methacrylate (50) | 198 | 0.5 | 3.5 | 96 |
| Comparative Example 1 | propylene/ethylene copolymer resin | styrene (100) | 199 | 0 | 58 | 42 |
| Comparative Example 2 | Resin No. 1 | — | — | 0 | 94 | 6 |
| Example 8 | Resin No. 4 | styrene (50) methyl methacrylate (50) | 198 | 0 | 2 | 98 |

Application Example 1 (Use as Adhesive Primer)

Ten parts by weight of the unsaturated copolymer resin composite prepared in Example 8 was dissolved in 100 parts by weight of toluene (50° C.) and the insoluble portion present in a trace amount was filtered off to prepare a clear colorless solution.

This primer solution was applied to the surface of a commercial low-density polyethylene blown bottle to form a primer coat in a thickness of 10 μm, which was dried with hot air at 60° C. Subsequently, a paint ("Acrylic Auto-white", trade name of Kansai Paint Co., Ltd.) was applied to the primer coat to form a coating 50 μm thick, which was dried and cured by heating with hot air (60° C.) for 5 hours.

A grid pattern of a hundred squares (1 mm×1 mm) was cut into the paint coating using a razor and an adhesive tape was applied over the cross-hatched area and quickly pulled off. None of the squares were pulled off.

The same test was conducted in the absence of the primer solution and all of the squares were pulled off.

Application Example 2 (Use as Aid for the Blending of Dissimilar Polymers)

Poly-2,6-dimethyl-1,4-phenylene ether (37.5 parts by weight; product of Mitsubishi Petrochemical Co., Ltd.), 37.5 parts by weight of polypropylene (MA-6 of Mitsubishi Petrochemical Co., Ltd.), 25 parts by weight of the unsaturated copolymer resin composite prepared in Example 5, 0.2 parts by weight of 2,6-di-t-butyl-4-methyl phenol (stabilizer) and 0.1 part by weight of Irganox® 1010 (trade name of Ciba-Geigy AG) were mixed and kneaded in a molten state in a Brabender Plastograph at 280° C. for 5 minutes. The blend was pressed into a sheet having a thickness of 2 mm.

Observation of a cross section of this sheet with an electron microscope revealed that the greater part of the poly-2,6-dimethyl-1,4-phenylene ether was finely dispersed in the sheet as particles of a size of 0.2 to 1 μm. In the absence of the unsaturated copolymer resin composite, the polymer was dispersed as coarse particles with a size of 1.5 to 10 μm.

The sheet incorporating the unsaturated copolymer resin composite of the present invention had an impact strength of 5.4 kg·cm/cm2 as measured by the DYN-STAT impact testing method (BS 1330-1946). A sheet prepared without using the unsaturated copolymer resin composite had an impact strength of only 1.8 kg·cm/cm².

While the invention has been described in detail and with reference to specific embodiments thereof, it will be apparent to one skilled in the art that various changes and modifications can be made therein without departing from the spirit and scope thereof.

What is claimed is:

1. An unsaturated copolymer resin composite prepared by subjecting 100 parts by weight of an unsaturated copolymer resin to conditions of radical graft polymerization together with more than 0 parts by weight but up to 300 parts by weight of a monomer capable of radical polymerization, said unsaturated copolymer resin being a copolymer composed of at least α-olefin selected from the group consisting of ethylene, propylene, 1-butene, 3-methyl-1-butene and 4-methyl-1-pentene, and at least one aliphatic nonconjugated diene represented by the following general formula (I), the content of said aliphatic nonconjugated diene being 0.05 to 50 mol %, and said unsatured copolymer resin having an elastic modules of 500 to 80,000 kg/cm²;

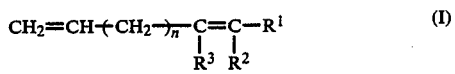

wherein n is an integer of 1 to 10; and $R^1$, $R^2$ and $R^3$ are each a hydrogen atom or an alkyl group having 1–8 carbon atoms, wherein said monomer capable of radical polymerization is at least one member selected from the group consisting of styrene, α-methylstyrene, vinyl chloride, acrylonitrile, vinyl acetate, esters of acrylic acid, methacrylic acid, maleic acid or fumaric acid wherein the alcohol component contains an alkyl moiety having 1 to 8 carbon atoms, glycidyl acrylate, glycidyl methacrylate, an alkyl ($C_{1-8}$) glycidyl maleate, an alkyl ($C_{1-8}$) glycidyl fumarate, and maleic anhydride.

2. An unsaturated copolymer resin composite according to claim 1, wherein the content of said alipatic nonconjugated diene is 0.1 to 30 mol %.

3. An unsaturated copolymer resin composite according to claim 1, wherein said aliphatic nonconjugated diene is either 4-methyl-1,4-hexadiene or 5-methyl-1,4-hexadiene or both.

4. An unsaturated copolymer resin composite according to claim 1, wherein said unsaturated copolymer resin has an elastic modulus of 1,000 to 50,000 kg/cm².

5. An unsaturated copolymer resin composite according to claim 1, wherein said monomer capable of radical polymerization is at least one member selected from the group consisting of styrene, an acrylate ester, a methacrylate ester and a fumarate ester, the alcohol component of each of said esters containing an alkyl moiety having 1 to 8 carbon atoms.

6. An unsaturated copolymer resin composite according to claim 1, wherein said monomer capable of radical polymerization is at least one member selected from the group consisting of glycidyl acrylate, glycidyl methacrylate, an alkyl ($C_{1-8}$) glycidyl maleate, and an alkyl ($C_{1-8}$) glycidyl fumarate.

7. An unsaturated copolymer resin composite according to claim 1, wherein said monomer capable of radical polymerization is present in an amount of 52 to 200 parts by weight per 100 parts by weight of said unsaturated copolymer resin.

8. An unsaturated copolymer resin composite according to claim 1, wherein said monomer capable of radical polymerization is present in an amount of 55 to 150 parts by weight per 100 parts by weight of said unsaturated copolymer resin.

9. An unsaturated copolymer resin composite according to claim 1, wherein the conditions of radical graft polymerization comprise irradiation with γ-rays or electron beam.

10. An unsaturated copolymer resin composite according to claim 1, wherein the conditions of radical graft polymerization comprise the presence of a radical polymerization catalyst.

11. An unsaturated copolymer resin composite according to claim 1, wherein the conditions of radical graft polymerization comprise the presence of an organic or inorganic peroxide or a redox system radical polymerization catalyst.

12. An unsaturated copolymer resin composite according to claim 1, wherein n is an integer of 1 to 3, and $R^1$, $R^2$ and $R^3$ are each a hydrogen atom or an alkyl group having 1 to 4 carbon atoms, provided that not all of $R^1$, $R^2$ and $R^3$ are a hydrogen atom at the same time.

13. An unsaturated copolymer resin composite according to claim 1, wherein n is an integer of 1, $R^1$ is an alkyl group having 1 to 3 carbon atoms, and $R^2$ and $R^3$ are each a hydrogen atom or an alkyl group having 1 to 3 carbon atoms, provided that $R^2$ and $R^3$ are not a hydrogen atom at the same time.

* * * * *

UNITED STATES PATENT AND TRADEMARK OFFICE
CERTIFICATE OF CORRECTION

PATENT NO. : 4,939,209

DATED : July 3, 1990

INVENTOR(S) : KITAGAWA ET AL

It is certified that error appears in the above-identified patent and that said Letters Patent is hereby corrected as shown below:

Col. 16, line 37;
    Claim 1, line 4, "0" should read --50--.

Signed and Sealed this

Twelfth Day of January, 1993

Attest:

DOUGLAS B. COMER

*Attesting Officer*   Acting Commissioner of Patents and Trademarks